United States Patent
Higashi et al.

(10) Patent No.: US 9,322,706 B2
(45) Date of Patent: Apr. 26, 2016

(54) METHOD FOR EVALUATING DISCOMFORT GLARE AND DISCOMFORT GLARE EVALUATION PROGRAM

(75) Inventors: Hirokuni Higashi, Kanagawa-ken (JP); Shota Koga, Kanagawa-ken (JP); Tomoko Ishiwata, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 680 days.

(21) Appl. No.: 13/597,430

(22) Filed: Aug. 29, 2012

(65) Prior Publication Data

US 2013/0054197 A1 Feb. 28, 2013

(30) Foreign Application Priority Data

Aug. 31, 2011 (JP) ................. 2011-189900

(51) Int. Cl.
*G06F 11/00* (2006.01)
*G01J 1/42* (2006.01)
*G06F 11/30* (2006.01)

(52) U.S. Cl.
CPC ........................................ *G01J 1/42* (2013.01)

(58) Field of Classification Search
CPC ........................................................ G01J 1/42
See application file for complete search history.

(56) References Cited

U.S. PATENT DOCUMENTS

| 2008/0068595 A1 | 3/2008 | Hagiwara |
| 2010/0117100 A1 | 5/2010 | Ogawa et al. |

FOREIGN PATENT DOCUMENTS

| CN | 101031997 A | 9/2007 |
| CN | 101737672 A | 6/2010 |
| JP | 2001-52505 | 2/2001 |
| JP | 2001-099704 A | 4/2001 |
| JP | 3800303 | 7/2006 |
| JP | 2011-034892 A | 2/2011 |

OTHER PUBLICATIONS

Japanese Office Action issued May 27, 2014, in Japan Patent Application No. 2011-189900 (with English translation).
Combined Chinese Office Action and Search Report issued Sep. 3, 2014 in Patent Application No. 201210319128.5 (with English language translation).
Japanese Office Action issued Dec. 19, 2014, in Japan Patent Application No. 2011-189900 (with English translation).
CIE Technical Report "Discomfort glare in interior lighting", (CIE117-1995), Published by the CIE Central Bureau in 1995, pp. 2-7.

(Continued)

*Primary Examiner* — Phuong Huynh
(74) *Attorney, Agent, or Firm* — Oblon, McClelland, Maier & Neustadt, L.L.P.

(57) ABSTRACT

According to one embodiment, a method is disclosed for evaluating discomfort glare. The method can include obtaining average luminance information relating to an average luminance La of a luminous surface of a luminaire, luminance uniformity ratio information relating to a luminance uniformity ratio U of the luminous surface, luminous surface size information relating to a size ω of the luminous surface, and background luminance information relating to a background luminance Lb of the luminaire. The method can include calculating an evaluation parameter value based on the La, the U, the ω, and the Lb obtained in the obtaining. The evaluation parameter value is a value of a product of a value based on the La, a value based on the U, and a value based on the ω divided by a value based on the Lb.

20 Claims, 11 Drawing Sheets

(56) References Cited

OTHER PUBLICATIONS

Office Action issued Mar. 19, 2015 in Chinese Patent Application No. 201210319128.5 (with English language translation).

Office Action issued on Aug. 4, 2015 in Chinese Patent Application No. 201210319128.5 with English translation.

Office Action issued in Dec. 18, 2015 in Chinese Patent Application No. 201210319128.5, along with an English translation.

| T/R \ H/R | 0.00 | 0.10 | 0.20 | 0.30 | 0.40 | 0.50 | 0.60 | 0.70 | 0.80 | 0.90 | 1.00 | 1.10 | 1.20 | 1.30 | 1.40 | 1.50 | 1.60 | 1.70 | 1.80 | 1.90 |
|---|---|---|---|---|---|---|---|---|---|---|---|---|---|---|---|---|---|---|---|---|
| 0.00 | 1.00 | 1.26 | 1.53 | 1.90 | 2.35 | 2.86 | 3.50 | 4.20 | 5.00 | 6.00 | 7.00 | 8.10 | 9.25 | 10.35 | 11.70 | 13.15 | 14.70 | 16.20 | — | — |
| 0.10 | 1.05 | 1.22 | 1.46 | 1.80 | 2.20 | 2.75 | 3.40 | 4.10 | 4.80 | 5.80 | 6.80 | 8.00 | 9.10 | 10.30 | 11.60 | 13.00 | 14.60 | 16.10 | — | — |
| 0.20 | 1.12 | 1.30 | 1.50 | 1.80 | 2.20 | 2.66 | 3.18 | 3.88 | 4.60 | 5.50 | 6.50 | 7.60 | 8.75 | 9.85 | 11.20 | 12.70 | 14.00 | 15.70 | — | — |
| 0.30 | 1.22 | 1.38 | 1.60 | 1.87 | 2.25 | 2.70 | 3.25 | 3.90 | 4.60 | 5.45 | 6.45 | 7.40 | 8.40 | 9.50 | 10.85 | 12.10 | 13.70 | 15.00 | — | — |
| 0.40 | 1.32 | 1.47 | 1.70 | 1.96 | 2.35 | 2.80 | 3.30 | 3.90 | 4.60 | 5.40 | 6.40 | 7.30 | 8.30 | 9.40 | 10.60 | 11.90 | 13.20 | 14.60 | 16.00 | — |
| 0.50 | 1.43 | 1.60 | 1.82 | 2.10 | 2.48 | 2.91 | 3.40 | 3.98 | 4.70 | 5.50 | 6.40 | 7.30 | 8.30 | 9.40 | 10.50 | 11.75 | 13.00 | 14.40 | 15.70 | — |
| 0.60 | 1.55 | 1.72 | 1.98 | 2.30 | 2.65 | 3.10 | 3.60 | 4.10 | 4.80 | 5.50 | 6.40 | 7.35 | 8.40 | 9.40 | 10.50 | 11.70 | 13.00 | 14.10 | 15.40 | — |
| 0.70 | 1.70 | 1.88 | 2.12 | 2.48 | 2.87 | 3.30 | 3.78 | 4.30 | 4.88 | 5.60 | 6.50 | 7.40 | 8.50 | 9.50 | 10.50 | 11.70 | 12.85 | 14.00 | 15.20 | — |
| 0.80 | 1.82 | 2.00 | 2.32 | 2.70 | 3.08 | 3.50 | 3.92 | 4.50 | 5.10 | 5.75 | 6.60 | 7.50 | 8.60 | 9.50 | 10.60 | 11.75 | 12.80 | 14.00 | 15.10 | — |
| 0.90 | 1.95 | 2.20 | 2.54 | 2.90 | 3.30 | 3.70 | 4.20 | 4.75 | 5.30 | 6.00 | 6.75 | 7.70 | 8.70 | 9.65 | 10.75 | 11.80 | 12.90 | 14.00 | 15.00 | 16.00 |
| 1.00 | 2.11 | 2.40 | 2.75 | 3.10 | 3.50 | 3.91 | 4.40 | 5.00 | 5.60 | 6.20 | 7.00 | 7.90 | 8.80 | 9.75 | 10.80 | 11.90 | 12.95 | 14.00 | 15.00 | 16.00 |
| 1.10 | 2.30 | 2.55 | 2.92 | 3.30 | 3.72 | 4.20 | 4.70 | 5.25 | 5.80 | 6.55 | 7.20 | 8.15 | 9.00 | 9.90 | 10.95 | 12.00 | 13.00 | 14.00 | 15.00 | 16.00 |
| 1.20 | 2.40 | 2.75 | 3.12 | 3.50 | 3.90 | 4.35 | 4.85 | 5.50 | 6.05 | 6.70 | 7.50 | 8.30 | 9.20 | 10.00 | 11.00 | 12.10 | 13.10 | 14.00 | 15.00 | 16.00 |
| 1.30 | 2.55 | 2.90 | 3.30 | 3.70 | 4.20 | 4.65 | 5.20 | 5.70 | 6.30 | 7.00 | 7.70 | 8.55 | 9.35 | 10.20 | 11.20 | 12.25 | 13.20 | 14.00 | 15.00 | 16.00 |
| 1.40 | 2.70 | 3.10 | 3.50 | 3.90 | 4.35 | 4.85 | 5.35 | 5.85 | 6.50 | 7.25 | 8.00 | 8.70 | 9.50 | 10.40 | 11.40 | 12.40 | 13.25 | 14.05 | 15.00 | 16.00 |
| 1.50 | 2.85 | 3.15 | 3.65 | 4.10 | 4.55 | 5.00 | 5.50 | 6.20 | 6.80 | 7.50 | 8.20 | 8.85 | 9.70 | 10.55 | 11.50 | 12.50 | 13.30 | 14.05 | 15.02 | 16.00 |
| 1.60 | 2.95 | 3.40 | 3.80 | 4.25 | 4.75 | 5.20 | 5.75 | 6.30 | 7.00 | 7.65 | 8.40 | 9.00 | 9.80 | 10.80 | 11.60 | 12.60 | 13.40 | 14.20 | 15.10 | 16.00 |
| 1.70 | 3.10 | 3.55 | 4.00 | 4.50 | 4.90 | 5.40 | 5.95 | 6.50 | 7.20 | 7.80 | 8.50 | 9.20 | 10.00 | 10.85 | 11.75 | 12.75 | 13.45 | 14.20 | 15.10 | 16.00 |
| 1.80 | 3.25 | 3.70 | 4.20 | 4.65 | 5.10 | 5.60 | 6.10 | 6.75 | 7.40 | 8.00 | 8.65 | 9.35 | 10.10 | 11.00 | 11.85 | 12.80 | 13.50 | 14.20 | 15.10 | 16.00 |
| 1.90 | 3.43 | 3.86 | 4.30 | 4.75 | 5.20 | 5.70 | 6.30 | 6.90 | 7.50 | 8.17 | 8.80 | 9.50 | 10.20 | 11.00 | 11.90 | 12.82 | 13.55 | 14.30 | 15.10 | 16.00 |
| 2.00 | 3.50 | 4.00 | 4.50 | 4.90 | 5.35 | 5.80 | 6.40 | 7.10 | 7.70 | 8.30 | 8.85 | 9.60 | 10.40 | 11.10 | 12.00 | 12.85 | 13.60 | 14.35 | 15.10 | 16.00 |
| 2.10 | 3.60 | 4.17 | 4.65 | 5.05 | 5.50 | 6.00 | 6.60 | 7.20 | 7.82 | 8.45 | 8.90 | 9.75 | 10.50 | 11.20 | 12.00 | 12.90 | 13.70 | 14.40 | 15.15 | 16.00 |
| 2.20 | 3.75 | 4.25 | 4.72 | 5.20 | 5.60 | 6.10 | 6.70 | 7.35 | 8.00 | 8.55 | 9.00 | 9.85 | 10.60 | 11.30 | 12.10 | 12.90 | 13.70 | 14.40 | 15.20 | 16.00 |
| 2.30 | 3.85 | 4.35 | 4.80 | 5.25 | 5.70 | 6.22 | 6.80 | 7.40 | 8.10 | 8.65 | 9.15 | 9.85 | 10.70 | 11.40 | 12.10 | 12.95 | 13.70 | 14.45 | 15.20 | 16.00 |
| 2.40 | 3.95 | 4.40 | 4.90 | 5.35 | 5.80 | 6.30 | 6.90 | 7.50 | 8.20 | 8.80 | 9.30 | 9.90 | 10.80 | 11.50 | 12.20 | 13.00 | 13.75 | 14.50 | 15.25 | 16.00 |
| 2.50 | 4.00 | 4.50 | 4.95 | 5.40 | 5.85 | 6.40 | 6.95 | 7.55 | 8.25 | 8.85 | 9.40 | 10.00 | 10.85 | 11.55 | 12.25 | 13.00 | 13.80 | 14.50 | 15.25 | 16.00 |
| 2.60 | 4.07 | 4.55 | 5.05 | 5.47 | 5.95 | 6.45 | 7.00 | 7.65 | 8.35 | 8.95 | 9.50 | 10.05 | 10.90 | 11.60 | 12.30 | 13.00 | 13.80 | 14.50 | 15.25 | 16.00 |
| 2.70 | 4.10 | 4.60 | 5.10 | 5.53 | 6.00 | 6.50 | 7.05 | 7.70 | 8.40 | 9.00 | 9.55 | 10.10 | 10.92 | 11.63 | 12.32 | 13.00 | 13.80 | 14.50 | 15.25 | 16.00 |
| 2.80 | 4.15 | 4.62 | 5.15 | 5.56 | 6.05 | 6.55 | 7.08 | 7.73 | 8.45 | 9.05 | 9.60 | 10.16 | 10.95 | 11.65 | 12.35 | 13.00 | 13.80 | 14.50 | 15.25 | 16.00 |
| 2.90 | 4.20 | 4.65 | 5.17 | 5.60 | 6.07 | 6.57 | 7.12 | 7.75 | 8.50 | 9.10 | 9.65 | 10.20 | 10.95 | 11.65 | 12.35 | 13.00 | 13.80 | 14.50 | 15.25 | 16.00 |
| 3.00 | 4.22 | 4.67 | 5.20 | 5.65 | 6.12 | 6.60 | 7.15 | 7.80 | 8.55 | 9.12 | 9.70 | 10.23 | 10.95 | 11.65 | 12.35 | 13.00 | 13.80 | 14.50 | 15.25 | 16.00 | p(pi) → (1.00 at T/R=0.00, H/R=0.00)

FIG. 4

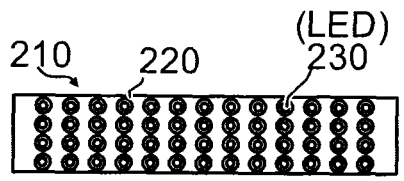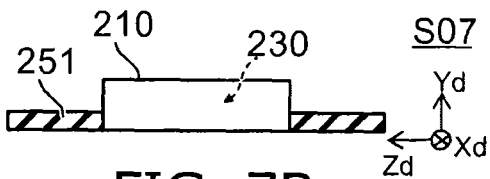
FIG. 7A    FIG. 7B
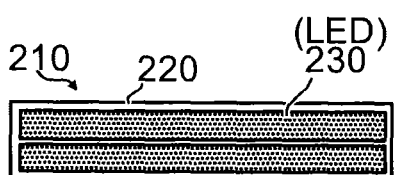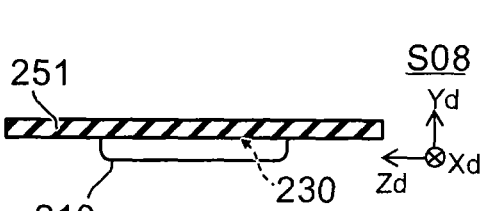
FIG. 7C    FIG. 7D
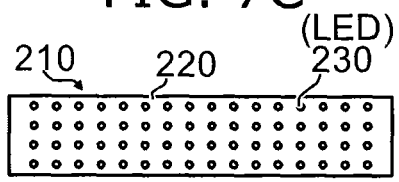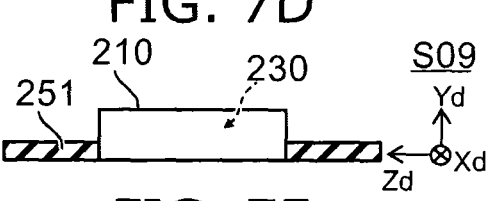
FIG. 7E    FIG. 7F
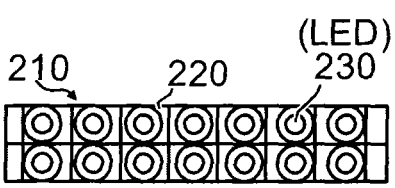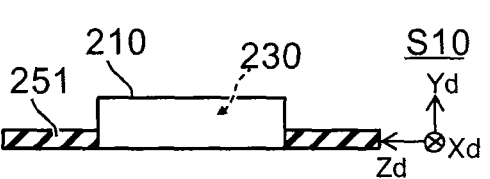
FIG. 7G    FIG. 7H
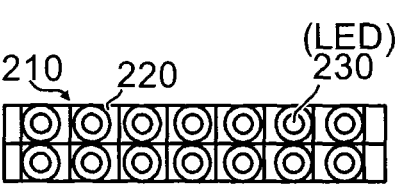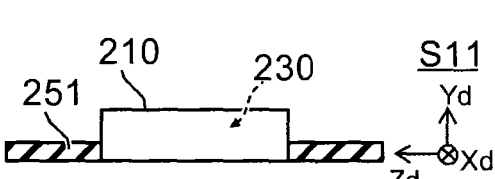
FIG. 7I    FIG. 7J
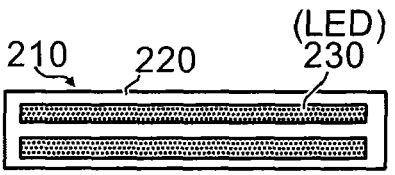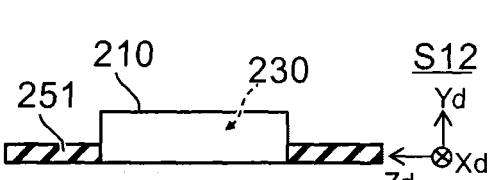
FIG. 7K    FIG. 7L

|  | type | Eave (lx) | |
|---|---|---|---|
|  |  | Rfw=82% | Rfw=51% |
| S01 | FL | 1172 | 954 |
| S02 | FL | 1172 | 954 |
| S03 | FL | 1135 | 969 |
| S04 | FL | 824 | 673 |
| S05 | FL | 1100 | 851 |
| S06 | LED | 1010 | 841 |
| S07 | LED | 1325 | 1097 |
| S08 | LED | 850 | 693 |
| S09 | LED | 1364 | 1106 |
| S10 | LED | 862 | 744 |
| S11 | LED | 897 | 794 |
| S12 | LED | 1315 | 1089 |

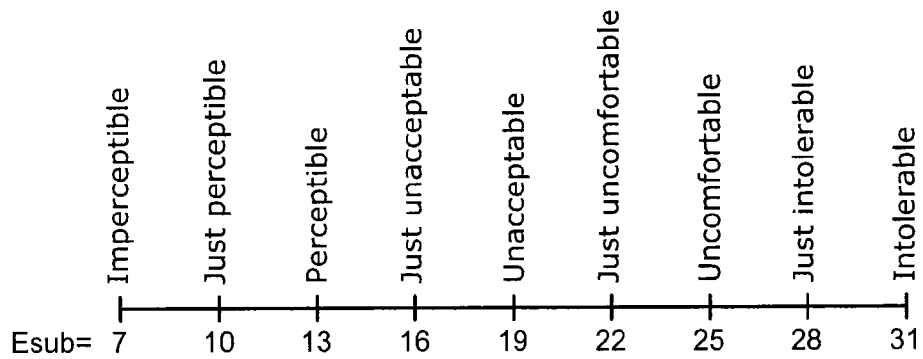
FIG. 10
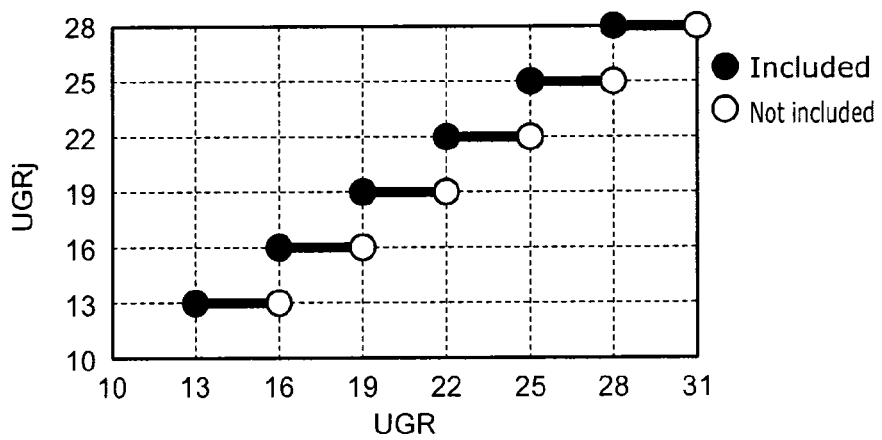
FIG. 11A
FIG. 11B

US 9,322,706 B2

METHOD FOR EVALUATING DISCOMFORT GLARE AND DISCOMFORT GLARE EVALUATION PROGRAM

CROSS-REFERENCE TO RELATED APPLICATIONS

This application is based upon and claims the benefit of priority from the prior Japanese Patent Application No. 2011-189900, filed on Aug. 31, 2011; the entire contents of which are incorporated herein by reference.

FIELD

Embodiments described herein relate generally to a method for evaluating discomfort glare and a discomfort glare evaluation program.

BACKGROUND

When designing lighting for luminaires or interior environments it is important to appropriately evaluate discomfort glare and obtain favorable glare characteristics. Here, various methods for evaluating discomfort glare are proposed.

Luminaires that use semiconductor light emitting devices such as Light Emitting Diodes (LED) have been developed. A method is thus required to appropriately evaluate glare from this kind of new luminaire.

BRIEF DESCRIPTION OF THE DRAWINGS

FIG. 4 is a table showing the position index used in the method for evaluating discomfort glare according to the first embodiment;

FIG. 6A to FIG. 6L and FIG. 7A to FIG. 7L are schematic views showing luminaires used in the experiments relating to discomfort glare;

FIG. 10 is a view showing subjective evaluation values in the experiments for evaluating discomfort glare;

FIG. 11A and FIG. 11B are views showing a relationship between the calculated values UGR and the UGR judgment values;

DETAILED DESCRIPTION

Figure 1:
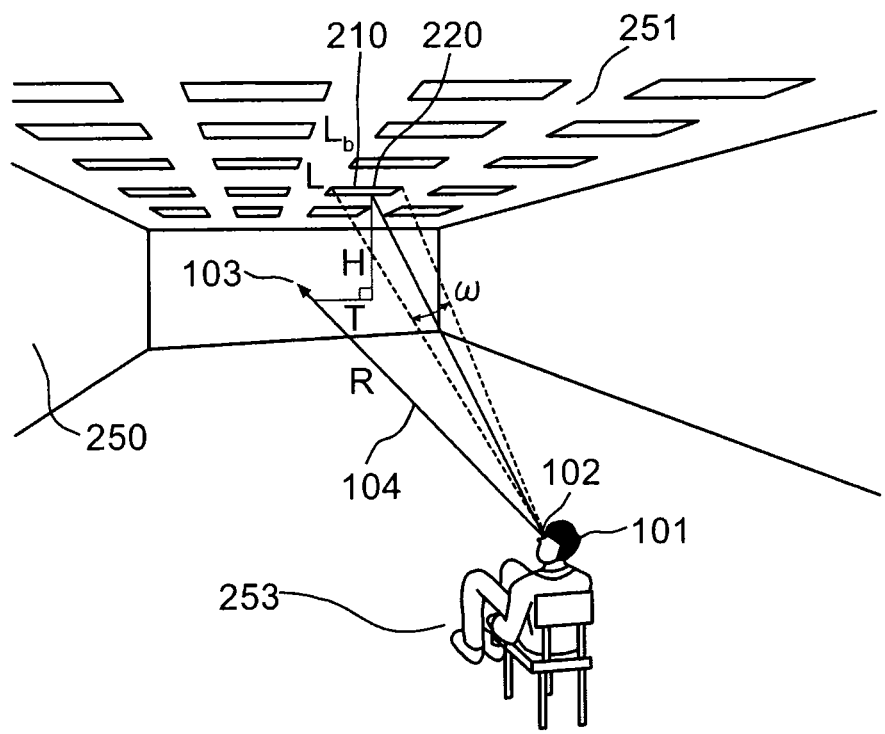
FIG. 1 is a schematic view showing a lighting environment to which a method for evaluating discomfort glare according to a first embodiment is applied.

According to one embodiment, a method is disclosed for evaluating discomfort glare. The method can include obtaining average luminance information relating to an average luminance La ($cd/m^2$) of a light luminous surface of a luminaire, luminance uniformity ratio information relating to a luminance uniformity ratio U (dimensionless value) of the luminous surface, luminous surface size information relating to a size $\omega$ (sr) of the luminous surface and background luminance information relating to a background luminance Lb ($cd/m^2$) of the luminaire. The method can include calculating an evaluation parameter value based on the average luminance La, the luminance uniformity ratio U, the luminous surface size $\omega$, and the background luminance Lb obtained in the obtaining. The evaluation parameter value is a value of a product of a value based on the La, a value based on the U, and a value based on the $\omega$ divided by a value based on the Lb.

According to another embodiment, a discomfort glare evaluation program includes causing a computer to obtain information including average luminance information relating to an average luminance La of a luminous surface of a luminaire, luminance uniformity ratio information relating to a luminance uniformity ratio U of the luminous surface, luminous surface size information relating to a size $\omega$ of the luminous surface, and background luminance information relating to a background luminance Lb of the luminaire and the program includes causing the computer to calculate an evaluation parameter value based on the average luminance La, the luminance uniformity ratio U, the luminous surface size $\omega$, and the background luminance Lb obtained in the information obtaining. The evaluation parameter value is a value of a product of a value based on the La, a value based on the U, and a value based on the $\omega$ divided by a value based on the Lb.

Various embodiments will be described hereinafter in detail with reference to the accompanying drawings.

The drawings are schematic and conceptual; and the relationships between the thickness and width of portions, the proportions of sizes among portions, etc., are not necessarily the same as the actual values thereof. Further, the dimensions and proportions may be illustrated differently among drawings, even for identical portions.

In the specification and drawings, components similar to those described or illustrated in a drawing thereinabove are marked with like reference numerals, and a detailed description is omitted as appropriate.

First Embodiment

FIG. 1 is a schematic view illustrating a lighting environment to which a method for evaluating discomfort glare according to a first embodiment is applied.

As shown in FIG. 1, a interior environment 250 to which the method for evaluating discomfort glare according to the embodiment may be applied is, for instance, a room. A luminaire 210 is provided on a ceiling 251 of the room (interior environment 250). An observer 101 is present on a floor 253 in the room. A line of sight 104 of the observer 101 connects a viewpoint 102 of the observer 101 with a look-at point 103 of the observer 101.

A distance along a direction of the line of sight 104 between the viewpoint 102 and the luminaires 210 is denoted as a line-of-sight distance R. A distance along the horizontal direction between line of sight 104 and the luminaire 210 is denoted as a horizontal distance T. A distance along a perpendicular direction between the line of sight 104 and the luminaire 210 is denoted as a perpendicular distance H.

For example, a luminance of a luminous surface 220 (light emitting face) of the luminaire 210 may be denoted as a luminance L (cd/m$^2$: candela/square meter). A background luminance of the luminaire 210 is denoted as a background luminance Lb (cd/m$^2$). A size of the luminaire 210 can, for example, be expressed as a solid angle. Specifically, the size (solid angle) of the luminous surface 220 is denoted as a size ω (sr: steradian).

Figure 2:
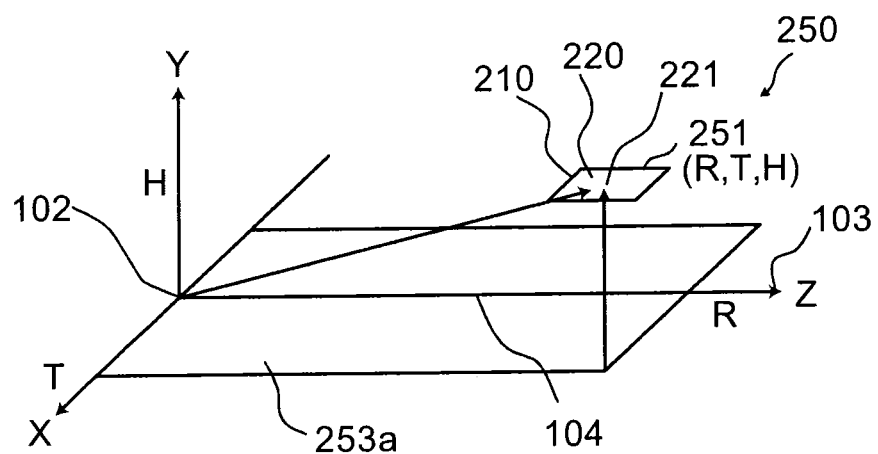
FIG. 2 is a schematic view showing a lighting environment to which the method for evaluating discomfort glare according to the first embodiment is applied.

FIG. 2 is a schematic view illustrating a lighting environment to which the method for evaluating discomfort glare according to the first embodiment is applied.

As shown in FIG. 2, the line of sight 104 connecting the viewpoint 102 and the look-at point 103 is parallel to a horizontal plane 253a.

For example, an axis parallel to the horizontal direction in the eyes of the observer 101 is denoted as an X-axis. An axis which is vertical in the eyes of the observer 101 is denoted as a Y-axis. An axis perpendicular to the X-axis and the Y-axis is denoted as the Z-axis.

Seen from the viewpoint 102, a position of a center of the luminous surface 220 (center of luminaire 221) of the luminaire 210 is expressed in terms of the line-of-sight distance R, horizontal distance T, and perpendicular distance H. For example, a distance along the X-axis between the line of sight 104 and the center of luminaire 221 corresponds to the horizontal distance T. A distance along the Y-axis between the line of sight 104 and the center of luminaire 221 corresponds to the perpendicular distance H. A distance along the line of sight 104 (such as the distance along the Z-axis) between the line of sight 104 and the center of luminaire 221 corresponds to the line-of-sight distance R.

In the method for evaluating discomfort glare according to the embodiment, an average luminance La and a luminance uniformity ratio U of the luminous surface 220 of the luminaire 210 are used. In the following, the above described parameters are explained.

FIG. 3A to FIG. 3D are schematic views illustrating luminaires to which the method for evaluating discomfort glare according to the first embodiment is applied.

Figure 3A:
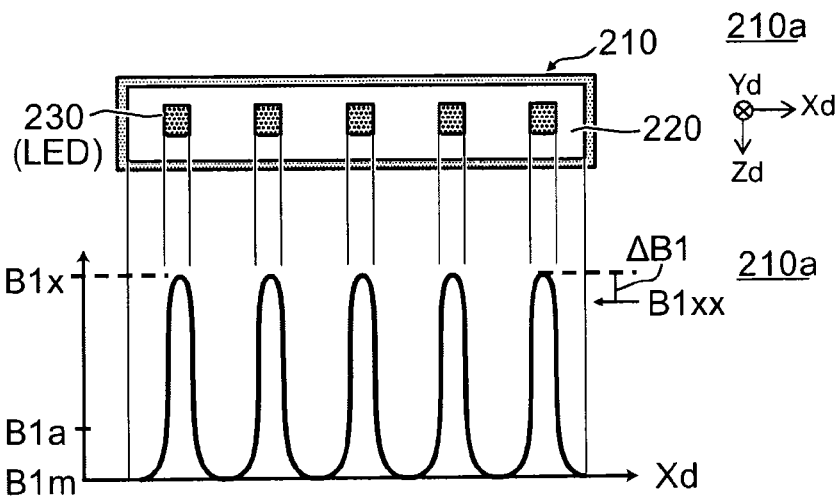
FIG. 3A to FIG. 3D are schematic views showing luminaires to which the method for evaluating discomfort glare according to the first embodiment is applied.
Figure 3B:
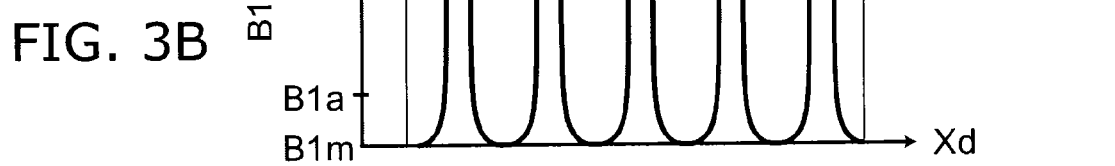
Figure 3C:
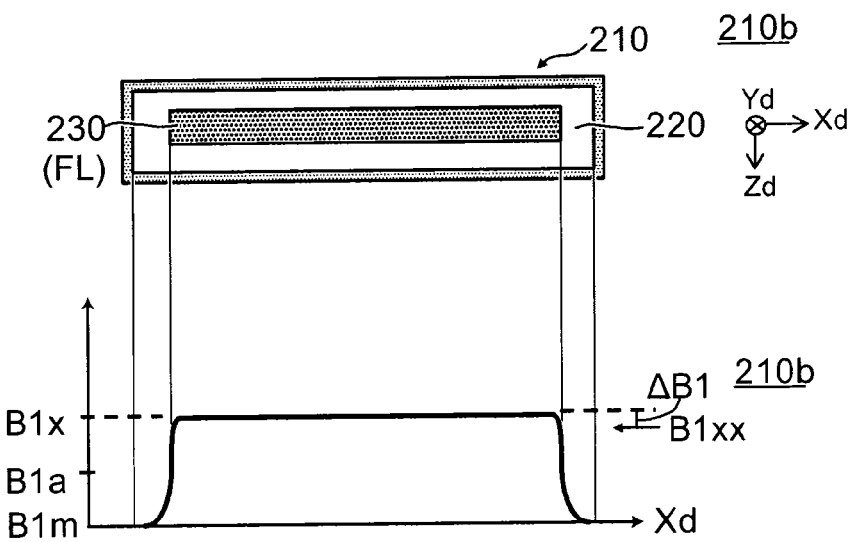
Figure 3D:
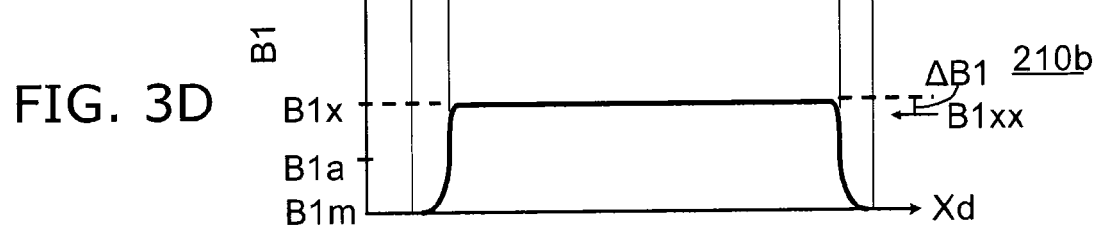

FIG. 3A is a plan view of the luminaire 210 of a first example 210a. FIG. 3B is a graph illustrating characteristics of the luminaire 210 of the first example 210a. FIG. 3C is a plan view of the luminaire 210 of a second example 210b. FIG. 3D is a graph illustrating characteristics of the luminaire 210 of the second example 210b.

Here, the axis perpendicular to the luminous surface 220 (light emitting face) of the luminaire 210 is denoted as a Zd-axis. One axis perpendicular to the Zd-axis is denoted as an Xd-axis. An axis perpendicular to the Zd-axis and the Xd-axis is denoted as the Yd-axis.

FIG. 3B and FIG. 3D illustrate luminance along the Xd-axis for the luminaire 210 of the first example 210a and the second example 210b, respectively. The horizontal axes in the graphs give a position along the Xd-axis. The vertical axes express a luminance B1 (arbitrary unit).

As shown in FIG. 3A, the luminaire 210 of the first example 210a includes a plurality of light sources 230. The plurality of light sources 230 is, for example, LEDs. The plurality of light sources 230 is aligned along the Xd-axis. A luminance of each of the plurality of light sources 230 is comparatively high.

As shown in FIG. 3B, in the first example 210a including the plurality of light sources 230, the luminance B1 varies greatly along the Xd-axis. Specifically, the luminance B1 is a maximum luminance B1x at positions corresponding to positions of the plurality of light sources 230. In other words, in the first example 210a, the uniformity ratio of the luminance B1 is low.

On the other hand, as shown in FIG. 3C, the luminaire 210 of the second example 210b includes a single light source 230. The light source 230 is, for example, a fluorescent lamp FL. The light source 230 extends along the Xd-axis.

As shown in FIG. 3D, in the second example 210b including the single light source 230, the luminance B1 varies little along the Xd-axis. More specifically, the luminance B1 is effectively constant along the Xd-axis. In other words, in the second example 210b, the uniformity ratio of the luminance B1 is high.

Thus, a state of the luminance B1 (such as the uniformity ratio) varies greatly according to a configuration of the luminaire 210.

As described in a later section, the inventors were first to discover that a degree of discomfort glare (such as brightness) experienced by people varies depending on the uniformity ratio of the luminaire 210. Based on the above phenomenon in the method for evaluating discomfort glare according to the embodiment, discomfort glare is evaluated using the luminance uniformity ratio U.

In the embodiment, the luminance uniformity ratio U (dimensionless value) of the luminous surface 220 of the luminaire 210 is expressed by U=B1a/B1x. Here, as shown in FIG. 3B and FIG. 3D, an average luminance B1a is the average value of the luminance B1 of the luminous surface 220 of the luminaire 210. The maximum luminance B1x is the maximum value of the luminance B1 of the luminous surface 220.

Note that, depending on the luminaire 210 to be evaluated, it may be difficult to define the maximum value of the luminance B1. In this case, as shown in FIG. 3B and FIG. 3D, a maximum luminance (effective maximum luminance B1xx) may be determined using a width ΔB1, which is a product of a difference between the peak of the luminance B1 and a minimum value B1m, and a predetermined value. For example, the width ΔB1 may be 10% of the difference between the peak value of the luminance B1 and the minimum value B1m. The maximum luminance (effective maximum luminance B1xx) is then a sum of the minimum value B1m and 90% of the difference between the peak value and the minimum value B1m. Alternatively for example, the width ΔB1 may be 20% of the difference between the peak value of the luminance B1 and the minimum value B1m. The maximum luminance (effective maximum luminance B1xx) is then a sum of the minimum value B1m and 80% of the difference between the peak value and the minimum value B1m. In this way, the effective maximum luminance B1xx may be used as the maximum luminance B1x.

Using the maximum luminance B1x determined in this way and the average luminance B1a, the luminance uniformity ratio U is determined as, for example, U=B1a/B1x. When the uniformity ratio of the luminance of the luminous surface 220 in the luminaire 210 is high, the value of the luminance uniformity ratio U is large. When the uniformity of the luminance is low, the value of the luminance uniformity ratio U is low.

In the method for evaluating discomfort glare according to the embodiment, the average luminance La (equivalent to the above-described average luminance B1a) and the luminance uniformity ratio U are used as the luminance L of the luminous surface 220. Based on these values, the background luminance Lb and the size ω of the luminous surface 220, an evaluation parameter value for the discomfort glare are calculated.

Thus, in the embodiment, the evaluation parameter value is calculated based on the average luminance La, the luminance uniformity ratio U, the luminous surface size ω and the background luminance Lb. Specifically, the evaluation parameter value is calculated by dividing the product of a value based on the La, a value based on the U and a value based on the ω, by a value based on the Lb. Then, in this method for evaluating discomfort glare, a value based on the evaluation parameter value may, for example, be outputted.

Accordingly, discomfort glare for the new luminaire 210 with LEDs or the like can be appropriately evaluated.

In the method for evaluating discomfort glare according to the invention, environment information relating to the interior environment 250 where the luminaire 210 is provided, and viewpoint information relating to the viewpoint 102 in the interior environment 250 may also be used. Also, information relating to a predetermined position index pi for an ith (where i is an integer not less than 1) luminaire 210, based on the environment information and the viewpoint information, may also be used.

The position index pi is determined in advance using the line-of-sight distance R, the horizontal distance T, and the perpendicular distance H.

FIG. 4 is a table illustrating the position index used in the method for evaluating discomfort glare according to the according to the first embodiment.

As shown in FIG. 4, the position index pi is determined according to a value of T/R and a value of H/R which correspond to the position of the luminaire 210 (position of the center of luminaire 221). Thus, the position index pi is determined according to the value of T/R and the value of H/R of the ith luminaire 210. For position indices pi between the T/R values shown in FIG. 4 and the values between the H/R values shown in FIG. 4, interpolations of the values shown in FIG. 4 are used. For the interpolation, one of linear interpolation and Lagrange interpolation is used.

For the ith (where i is an integer not less than 1) luminaire 210, an evaluation parameter value Y is calculated using formula 1 below from an average luminance Li (cd/m$^2$) of the luminous surface 220, a luminance uniformity ratio Ui (dimensionless value) of the luminous surface 220, a size ωi (sr) of the luminous surface 220, the position index pi (dimensionless value) and the background luminance Lb (cd/m$^2$) of the background around the ith luminaire 210.

$$Y = A \cdot \left[ \log \left\{ \frac{1}{L_b^a} \sum_i \frac{L_i^b \cdot f_i(U) \cdot \omega_i^c}{p_i^d} \right\} \right] + const1 \quad \text{(formula 1)}$$

$$f_i(U) = B \cdot (\log_k(U))^n + const2$$

In formulae 1, A, B, a, b, c, d, k, n, const 1 and const 2 are constants, and a, b, c, d, k and n are not less than 0 and not more than 10. "·" represents multiplication.

Accordingly, discomfort glare for the new luminaire 210 with LEDs or the like can be appropriately evaluated.

In the following, experiments which formed the basis for creating the method for evaluating discomfort glare according to the embodiment are described.

Figure 5:
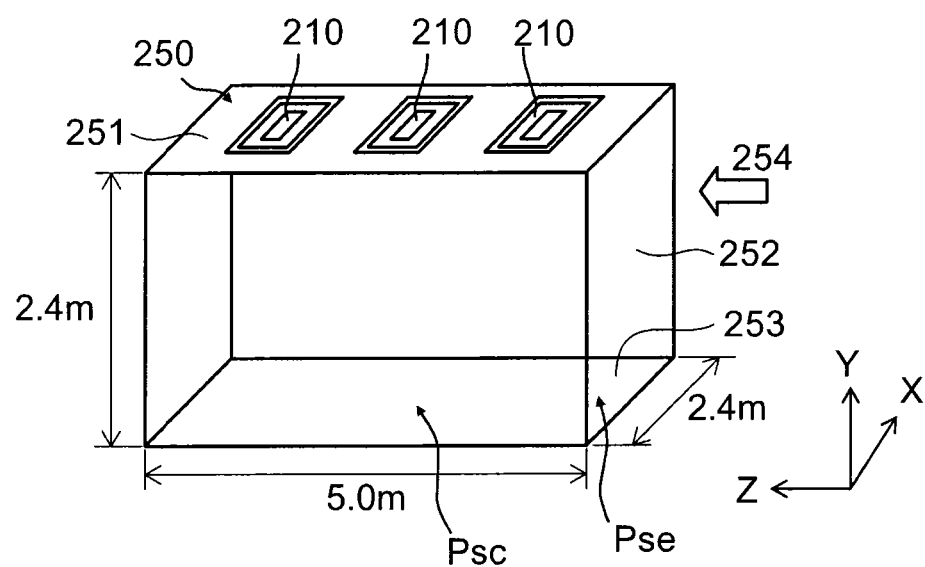
FIG. 5 is a schematic view showing an evaluation environment used in an experiment relating to discomfort glare.

FIG. 5 is a schematic view illustrating an evaluation environment used in an experiment relating to discomfort glare.

As shown in FIG. 5, in this experiment, a room with a depth (length along the Z-axis) of 5.0 meters, a width (length along the X direction) of 2.4 m and a height (length along the Y direction) of 2.4 m was used as the evaluation environment (interior environment 250).

A reflectance of the ceiling 251 of the interior environment 250 is 82% and a reflectance of the floor 253 is 20%. For walls 252, two types were used, walls with a high-reflectance state (reflectance of 82%) and walls with a low-reflectance state (reflectance of 51%).

For the luminaire 210, the below-described 12 types of luminaire were used. For each of the 12 types of luminaire 210, the luminaire 210 was installed at 3 locations in the ceiling 251 of the interior environment 250.

For the position of the observer 101, two positions were used, a first position Pse and a second position Psc. The first position Pse is a position near an entrance 254 in the interior environment 250. The second position Psc is a position at a central portion of the floor 253 of the interior environment 250. The line of sight 104 of the observer 101 was assumed to be horizontal (parallel to the X-Y plane) and the height of the line of sight 104 was assumed to be 1.2 m.

As subjects, 18 people (Japanese) took the part of the observer 101, including 9 women and 9 men.

FIG. 6A to FIG. 6L and FIG. 7A to FIG. 7L are schematic views illustrating luminaires used in the experiments relating to discomfort glare.

FIG. 6A, FIG. 6C, FIG. 6E, FIG. 6G, FIG. 6I, FIG. 6K, FIG. 7A, FIG. 7C, FIG. 7E, FIG. 7G, FIG. 7I and FIG. 7K are plan views. FIG. 6B, FIG. 6D, FIG. 6F, FIG. 6H, FIG. 6J, FIG. 6L, FIG. 7B, FIG. 7D, FIG. 7F, FIG. 7H, FIG. 7J and FIG. 7L are cross-sectional views.

Figure 6A:
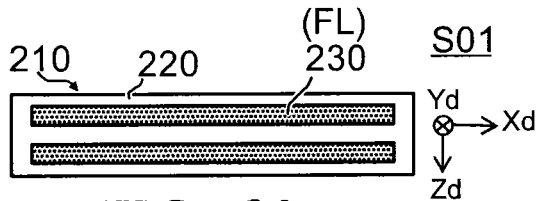
Figure 6B:
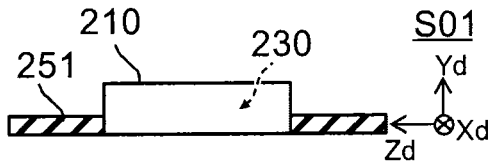

As shown in FIG. 6A and FIG. 6B, the luminaire 210 of a first sample S01 is a bottom-face-open-type recessed luminaire provided in the ceiling 251 and including a light source 230 which is the fluorescent lamp FL. A color of the emitted light is neutral white.

Figure 6C:
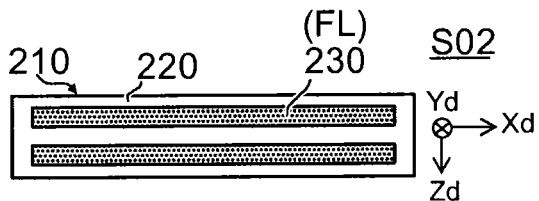
Figure 6D:
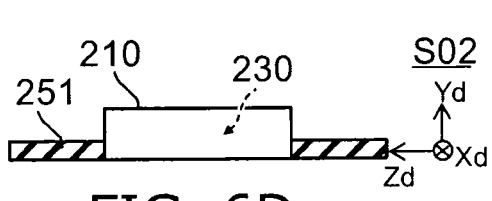

As shown in FIG. 6C and FIG. 6D, the luminaire 210 of a second sample S02 is a bottom-face-open-type recessed luminaire provided including the light source 230 which is the fluorescent lamp FL. The color of the emitted light is warm white.

Figure 6E:
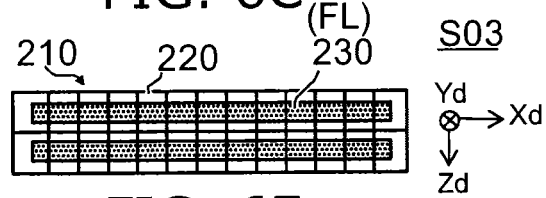
Figure 6F:
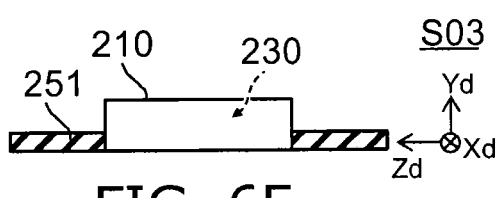

As shown in FIG. 6E and FIG. 6F, the luminaire 210 of a third sample S03 is an OA louver-type recessed luminaire including the light source 230 which is the fluorescent lamp FL.

Figure 6G:
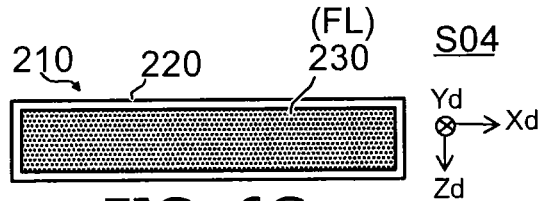
Figure 6H:
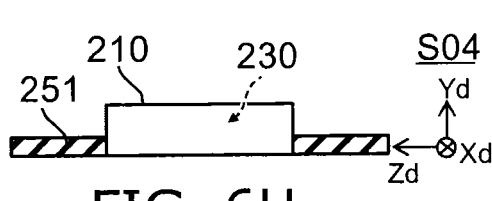

As shown in FIG. 6G and FIG. 6H, the luminaire 210 of a fourth sample S04 is a diffused-shade-panel-type recessed luminaire including the light source 230 which the fluorescent lamp FL.

Figure 6I:
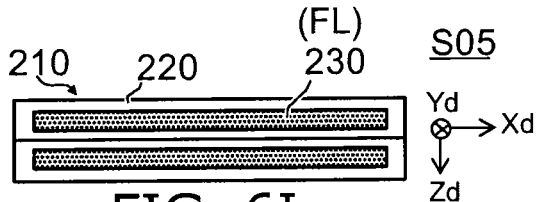
Figure 6J:
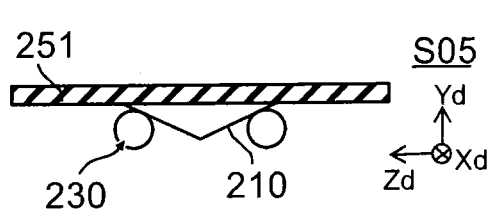

As shown in FIG. 6I and FIG. 6J, the luminaire 210 of a fifth sample S05 is a wide-angle-type surface-mounted luminaire provided on the ceiling 251 and including the light source 230 which is the fluorescent lamp FL.

Figure 6K:
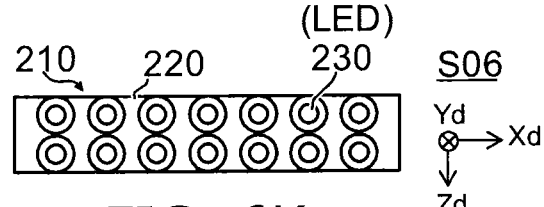
Figure 6L:
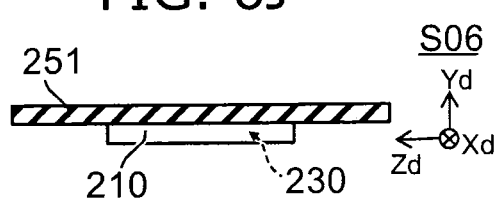

As shown in FIG. 6K and FIG. 6L, the luminaire 210 of a sixth sample S06 is a transparent-acrylic-panel-type surface-mounted luminaire including a light source 230 which is a plurality of LEDs.

As shown in FIG. 7A and FIG. 7B, the luminaire 210 of a seventh sample S07 is a transparent-acrylic-panel-type recessed luminaire including a light source 230 which is a plurality of LEDs. A pitch of the arrangement of the light sources 230 in the seventh sample S07 is shorter than that of the sixth sample S06. A density of the light sources 230 in the seventh sample S07 is higher than that of the sixth sample S06.

As shown in FIG. 7C and FIG. 7D, the luminaire 210 of an eighth sample S08 is an opaque-panel-type surface-mounted luminaire including a light source 230 which is a plurality of LEDs.

As shown in FIG. 7E and FIG. 7F, the luminaire 210 of a ninth sample S09 is a transparent-acrylic-panel-type recessed luminaire including a light source 230 which is a plurality of LEDs.

As shown in FIG. 7G and FIG. 7H, the luminaire 210 of a tenth sample S10 is a white-louver-type recessed luminaire including a light source 230 which is a plurality of LEDs.

As shown in FIG. 7I and FIG. 7J, the luminaire 210 of an eleventh sample S11 is a mirror-faced-louver-type recessed luminaire including a light source 230 which is a plurality of LEDs.

As shown in FIG. 7K and FIG. 7I, the luminaire 210 of a twelfth sample S12 is a linear-type recessed luminaire including a light source 230 which is a plurality of LEDs.

Each of the 12 types of luminaire 210 described above was installed at 3 locations in the ceiling 251 of the interior environment 250.

Figures 8, 9A, 9B:
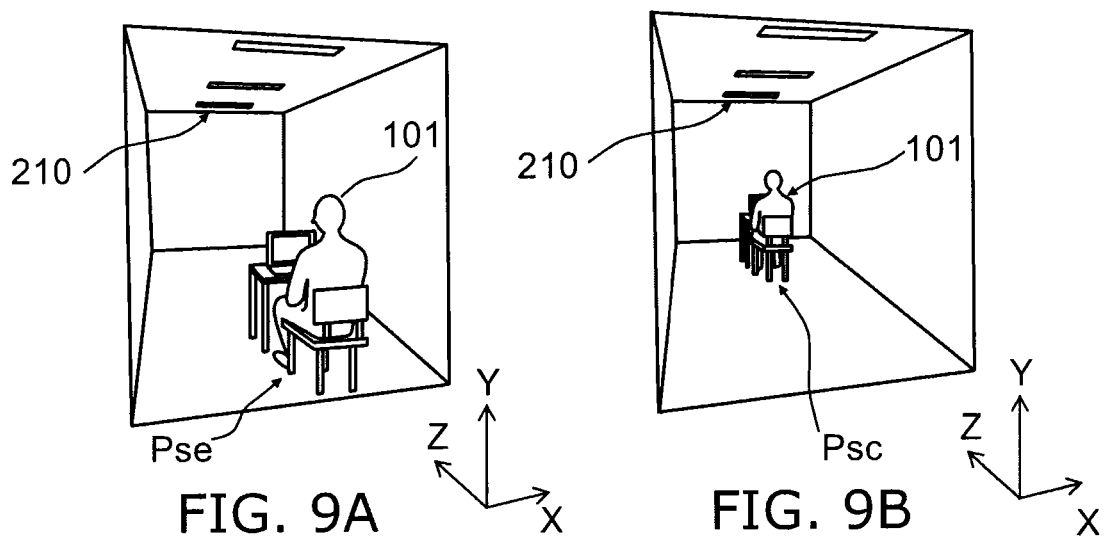
FIG. 8 is a schematic view showing characteristics of the luminaires used in the experiments relating to discomfort glare.
FIG. 9A and FIG. 9B are schematic views showing states of the experiments for evaluating discomfort glare.

FIG. 8 is a schematic view showing characteristics of the luminaires used in the experiments relating to discomfort glare.

FIG. 8 shows an average illuminance Eave (Ix) of the luminaire 210 of the first to twelfth samples S01 to S12. As already described, in this experiment, evaluation is performed under two conditions, which are a condition under which the reflectance Rfw of the walls 252 is 82% and a condition under which the reflectance Rfw of walls is 51%. FIG. 8 shows the average illuminance Eave of the luminaires 210 of the first to twelfth samples S01 to S12 under the two conditions.

FIG. 9A and FIG. 9B are schematic views illustrating states of the experiments for evaluating discomfort glare. FIG. 9A shows a state in which the observer 101 is positioned at first position Pse (position near entrance 254). FIG. 9B shows a state in which the observer 101 is positioned at second position Psc (position of central portion of the floor 253). The above-described 12 types of luminaire 210 were installed and subjective evaluations of the discomfort glare for each type were made.

FIG. 10 is a view illustrating subjective evaluation values in the experiments to evaluate discomfort glare.

As shown in FIG. 10, in the subjective evaluation, subjective evaluation values Esub (7 to 31) relating to the extent of the discomfort glare were used. Specifically, the subjective evaluation value Esub of 7 corresponds to "imperceptible", the subjective evaluation value Esub of 10 corresponds to "just perceptible", the subjective evaluation value Esub of 13 corresponds to "perceptible", the subjective evaluation value Esub of 16 corresponds to "just unacceptable", the subjective evaluation value Esub of 19 corresponds to "unacceptable", the subjective evaluation value Esub of 22 corresponds to "just uncomfortable", the subjective evaluation value Esub of 25 corresponds to "uncomfortable", the subjective evaluation value Esub of 28 corresponds to "just intolerable", and the subjective evaluation value Esub of 31 corresponds to "intolerable".

For the 12 types of luminaire 210 (first to twelfth samples S01 to S12), a total of 48 conditions were subjectively evaluated by the observers 101 (subjects). Specifically, the evaluations included for each sample, evaluations at two positions (first position Pse and the second position Psc) using the two internal conditions (reflectance Rfw of the walls 252 of 82% or 51%). Each of the subjects responded using the subjective evaluation values Esub (personal subjective evaluation values Esubp). The average value of all the subjects' personal subjective evaluation values Esubp was then calculated for each of the 48 conditions and denoted as the subjective evaluation value Esuba.

In contrast, as a method for evaluating discomfort glare for a reference example, calculated values UGR (Unified Glare Rating), which are expressed in formula 2 below, were calculated.

$$UGR = 8 \cdot \log\left[\frac{0.25}{L_b} \sum \frac{L^2 \cdot \omega}{p^2}\right] \quad \text{(formula 2)}$$

Here, L is the luminaire luminance. In this case, an average luminance La is used. Lb is a background luminance. ω is a solid angle (size) of the luminous surface 220 of the luminaire 210. p is a position index of the luminaire 210, and is the value illustrated in FIG. 4.

Then, to ensure that the calculated values UGR corresponded to the subjective evaluation values Esub, converted calculated values UGRg were used. UGRg=UGR−3. The above described calculated values UGR were determined based on an experimental formula for which the subjects were not Japanese. It was therefore known that the values of the subjective results and calculated values UGR would not necessarily match when the subjects were Japanese. The conversion was performed to correct this.

FIG. 11A and FIG. 11B are views illustrating a relationship between the calculated values UGR and the UGR judgment values.

The two views illustrate the relationship between the calculated values UGR and the UGR judgment values (UGRj) for Japanese people. This relationship corresponds to the relationship between the calculated values UGR and the UGR judgment values, as described in the Lighting Standard Design Guidelines (JCIE. 2009) for indoor workspaces. As is clear from the two views, in the case of Japanese people, it is appropriate to use (UGR−3) as the UGR judgment values (UGRj).

Hence, in this experiment, an evaluation was made of a relationship between the subjective evaluation results (subjective evaluation values Esuba) and the converted calculated values UGRg (=UGR−3). Hereinafter, for simplicity, the "converted calculated values UGRg" are denoted simply as "UGRg value".

Figure 12:
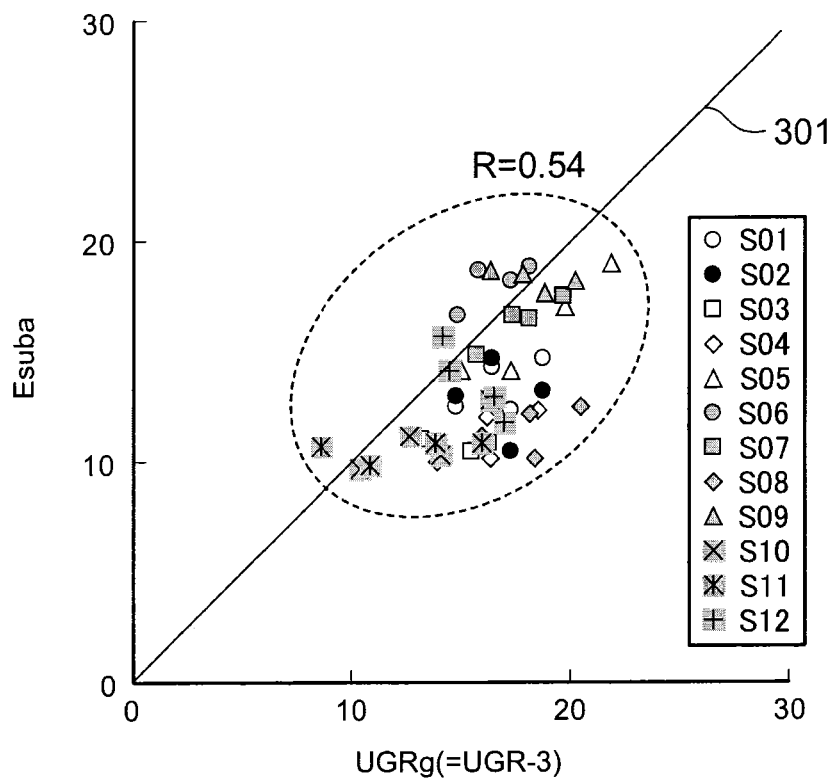
FIG. 12 and FIG. 13 are graphs showing experimental results relating to discomfort glare.

FIG. 12 is a graph illustrating experimental results relating to discomfort glare.

In FIG. 12, the horizontal axis is UGRg value (=UGR−3) and the vertical axis is subjective evaluation value Esuba.

In FIG. 12, a sloped line 301 is the straight line for a relationship of Esuba=UGRg. For example, points positioned above the sloped line 301 correspond to the case in which the experimental results (subjective evaluation values Esuba) have been evaluated as being brighter than would be expected from the UGRg values.

As seen in FIG. 12, the UGRg value increases as the subjective calculated value increases, and the UGRg value has a significant correlation with the subjective evaluation value Esuba. However, the correlation (R) between the UGRg value and the subjective evaluation values Esuba is 0.54, and scatter is large. Thus, a degree of matching between the above-described calculated values UGR (and UGRg values) and the subjective evaluation results is insufficient.

The inventors further analyzed the results of this experiment.

Figure 13:
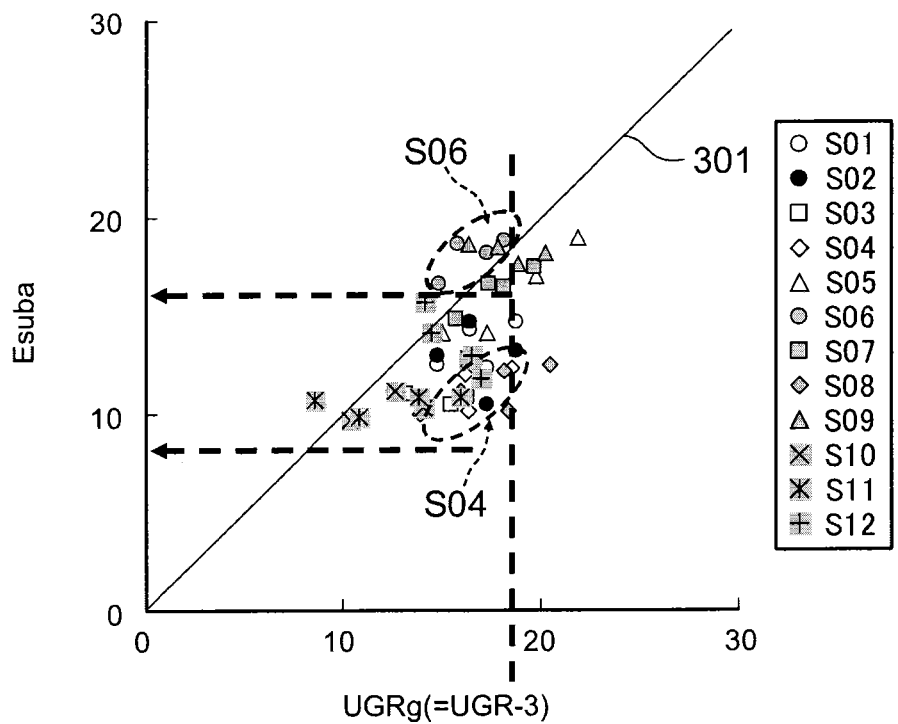

FIG. 13 is a graph illustrating experimental results relating to discomfort glare.

In FIG. 13, in the experimental results illustrated in FIG. 12, marks have been added to data for a portion of the conditions. As shown in FIG. 13, the sixth sample S06, which is positioned above the sloped line 301, is for the LED-type luminaire 210 and has a low luminance uniformity ratio. By contrast, the fourth sample S04, which is positioned below the sloped line 301, is for the FL-type luminaire 210 and has a high luminance uniformity ratio. Specifically, the luminance uniformity ratio U of the sixth sample S06 is 0.01 and the luminance uniformity ratio U of the fourth sample S04 is 0.77.

Thus, it can be seen from the evaluation results that there is a large difference in the luminance uniformity ratio U for samples significantly above the sloped line 301 and samples significantly below the sloped line 301. Even when the UGRg values were substantially the same, there was a tendency for the subjective evaluation results to differ greatly according to the difference in the luminance uniformity ratio U.

Such experimental results were obtained for the first time through the experiments independently carried out by the inventors. Luminance uniformity ratio U tends to be low for the LED-type luminaires which are increasingly used in practical applications. In these new luminaires, the difference between the subjective evaluation results and the calculated values UGR (and UGRg values) can easily be large. Thus, the problem of how to reduce this difference was newly discovered. The embodiment provides a configuration capable of appropriately evaluating discomfort glare while reducing the difference between the subjective evaluation results and the calculated values.

The inventors noticed a phenomenon whereby, as described in FIG. 13, even when the UGRg values were effectively the same, there would be large difference in the subjective evaluation results due to differences in the luminance uniformity ratio U. Based on this experimental fact, the inventors configured the method for evaluating discomfort glare according to the embodiment.

Specifically in the method for evaluating discomfort glare according to the embodiment, the evaluation parameter values are calculated based not only on the luminance (average luminance La) of the luminous surface 220 of the luminaire 210, but also on the luminance uniformity ratio U.

Specifically, the inventors introduced an evaluation parameter Y expressed using the below-described formula 3 (which is the same as formula 1) as a calculated value corresponding to the subjective evaluation value Esub in the above-described experimental results.

$$Y = A \cdot \left[ \log \left\{ \frac{1}{L_b^a} \sum_i \frac{L_i^b \cdot f_i(U) \cdot \omega_i^c}{p_i^d} \right\} \right] + const1 \quad \text{(formula 3)}$$

$$f_i(U) = B \cdot (\log_k(U))^n + const2$$

In this experiment, three luminaires 210 were used, giving i=1 to 3. For each of the first to third luminaires 210, the position index pi was found from FIG. 4. For the ith luminaire 210, the above-described evaluation parameter value Y was calculated using the average luminance Li of the luminous surface 220, the luminance uniformity ratio Ui of the luminous surface 220, the size ωi of the luminous surface 220, and the position index pi.

Specifically, the below-described formula 4 and formula 5 were used.

$$Y = A \cdot \left[ \log \frac{1}{4L_b} \sum \frac{L^2 \cdot f(U) \cdot \omega}{p^2} \right] \quad \text{(formula 4)}$$

$$f(U) = -0.069 \cdot (\log_e(U))^3 + 0.412 \quad \text{(formula 5)}$$

The above-described constant A was then calculated so as to reduce the differences between the subjective evaluation results (the subjective evaluation values Esuba). As a result, the below-described Formula 6 was found.

$$Y = 5.712 \cdot \left[ \log \frac{1}{4L_b} \sum \frac{L^2 \cdot f(U) \cdot \omega}{p^2} \right] \quad \text{(formula 6)}$$

A relationship between the evaluation parameter value Y expressed in formula 6 and the subjective evaluation values Esuba is described below.

Figure 14:
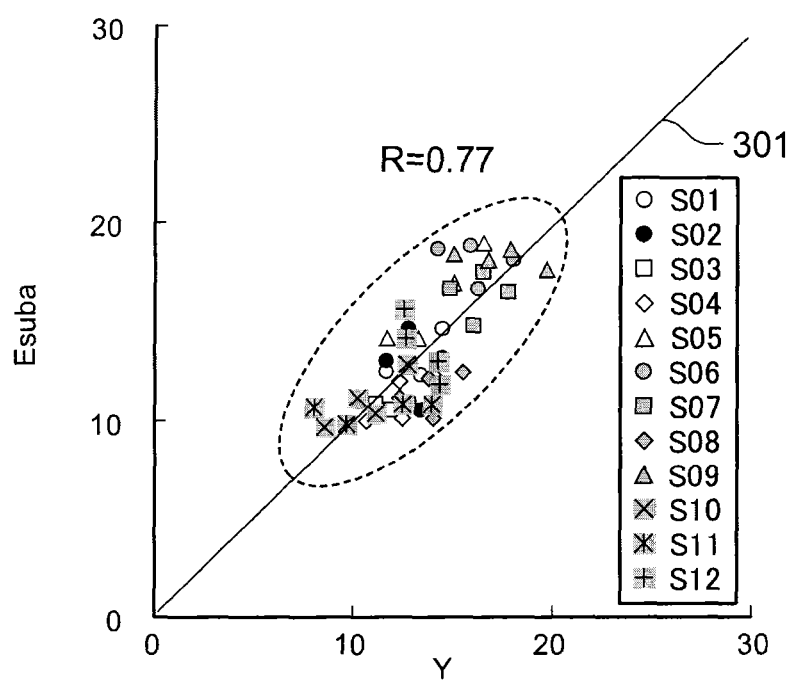
FIG. 14 is a graph showing evaluation results obtained by the method for evaluating discomfort glare according to the first embodiment.

FIG. 14 is a graph illustrating evaluation results obtained by the method for evaluating discomfort glare according to the first embodiment.

In FIG. 14, the horizontal axis is the evaluation parameter value Y expressed in formula 6 and the vertical axis is the subjective evaluation value Esuba.

As can be seen in FIG. 14, the degree of matching of the evaluation parameter value Y with the subjective evaluation value Esuba is high. In fact, the correlation (R) between the subjective evaluation values Esuba and the evaluation parameter values Y was 0.77.

Thus, according to the method for evaluating discomfort glare of the embodiment, an evaluation can be made in which the degree of matching with the subjective evaluation results is higher than in the case that the calculated values UGR (and UGRg) are used. Thus, an evaluation of discomfort glare can be appropriately made even for new luminaires with low luminance uniformity ratios U.

The constants of formula 5 and formula 6 were determined to achieve a match with the experimental results, and can therefore be appropriately changed according to the desired condition for evaluating the discomfort glare.

According to the investigation of the inventors, a and c in formula 1 (which is the same as formula 3) are preferably not less than 0 and not more than 1. For b and d, a value of 2 is preferable. In this case, it is more likely that the correlation between the evaluation parameter Y and the subjective evaluation values Esuba will be high. Also, for k, the base of the natural logarithm (approximately 2.718) may, for example, be used. Also, n may, for example, be not less than 2.3 and not more than 3.5. Specifically, n may be 3. Accordingly, the correlation is more likely to be high.

Figure 15:
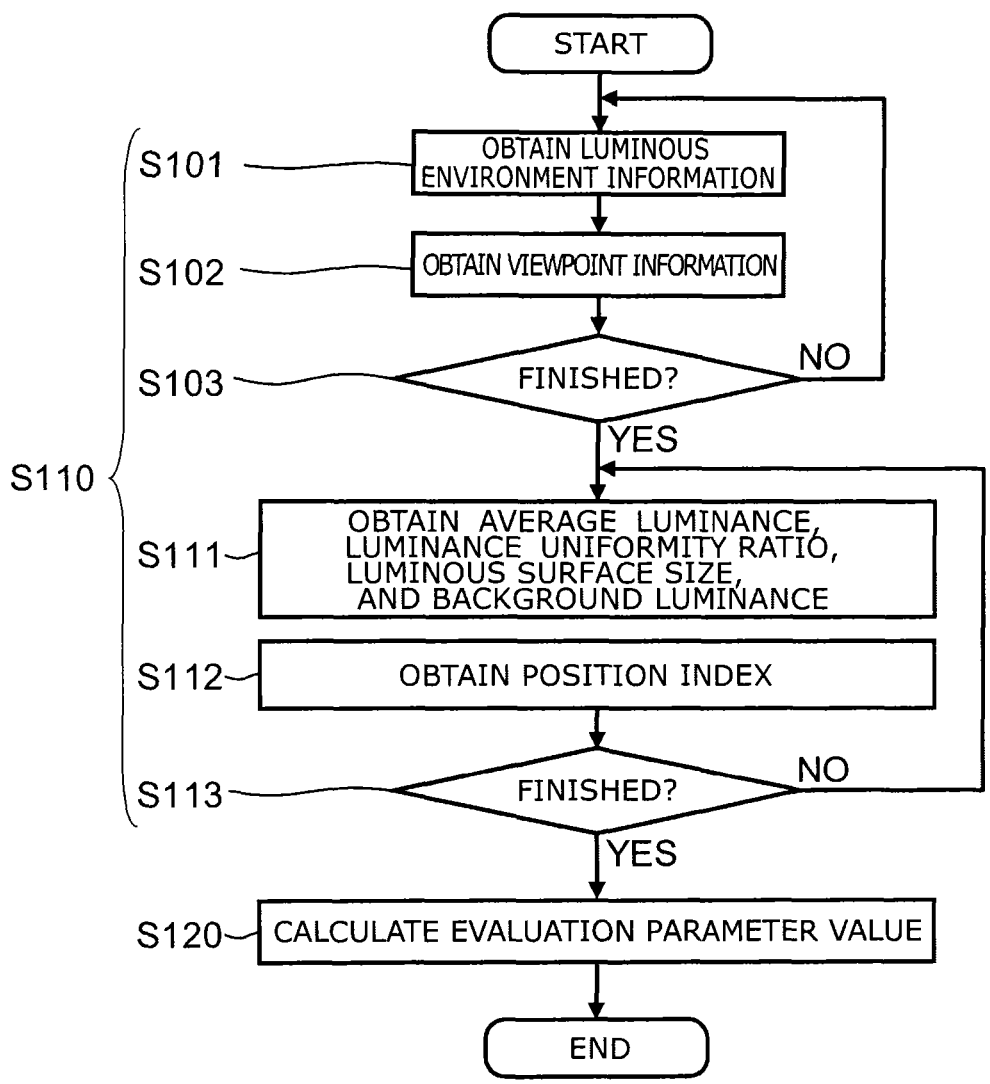
FIG. 15 is a flowchart showing the method for evaluating discomfort glare according to the first embodiment.

FIG. 15 is a flowchart illustrating the method for evaluating discomfort glare according to the first embodiment.

As shown in FIG. 15, the method for evaluating discomfort glare according to the first embodiment includes an information obtaining process (Step S110) and a calculating process (Step S120).

The information obtaining process (Step S110) includes obtaining average luminance information relating to the average luminance La of the luminous surface 220 of the luminaire 210, luminance uniformity ratio information relating to the luminance uniformity ratio U of the luminous surface 220, luminous surface size information relating to the size ω of the luminous surface 220, and background luminance information relating to the background luminance Lb of the luminaire 210 (Step S111).

In the calculating process (Step S120), an evaluation parameter value is calculated based on the average luminance La obtained in the information obtaining process, the luminance uniformity ratio U, the luminous surface size ω, and the background luminance Lb, an evaluation. Specifically, the evaluation parameter value is calculated by dividing a product of a value based on La, a value based on U, and a value based on ω, by a value based on Lb.

In the calculating process (Step S120), a value based on the calculated evaluation parameter value can be outputted.

The information obtaining process (Step S110) may further include obtaining environment information relating to the interior environment 250 where the luminaire 210 is provided (Step S101) and obtaining viewpoint information relating to the viewpoint 102 in the interior environment 250 (Step S102).

The information obtaining process (Step S110) may further include obtaining a predetermined position index pi for the ith (where i is an integer not less than 1) luminaire 210 (Step S112) based on the environment information and the viewpoint information.

The average luminance information includes the average luminance Li of the luminous surface 220 of the ith luminaire 210. The luminance uniformity ratio information includes the luminance uniformity ratio Ui of the luminous surface 220 of the ith luminaire 210. The luminous surface size information includes a size ωi of the luminous surface 220 of the ith luminaire 210. Also, the calculating process (Step S120) includes calculating, as the evaluation parameter value, the evaluation parameter value Y expressed in the above-described Formula 1. Further, the calculating process (Step S120) may include calculating a value based on the evaluation parameter value.

For example, in the obtaining of the environment information relating to the interior environment 250 (Step S101), information relating to a size of the interior environment 250, an internal reflectance of the interior environment 250, information about the luminaire 210 and a number of the luminaires 210 and the like, is obtained as the information relating to the interior environment 250. The information about the luminaire 210 includes a distribution of luminous intensity of the luminaire 210, a maximum luminance of the light emitting face (such as the luminous surface 220), a size (such as an area in meters squared) of the light emitting face, a conservation ratio, a dimming ratio and the like. The information relating to the interior environment 250 may be set by a user of the method for evaluating discomfort glare or obtained from an information source.

For example, in the obtaining of the viewpoint information relating to the viewpoint 102 in the interior environment 250 (Step S102), information relating to the position of the viewpoint 102 in the interior environment 250 is obtained. The viewpoint information may be set by a user of the method for evaluating discomfort glare or obtained from an information source.

After executing Step S101 and Step S102, the process determines whether the obtaining is finished (setting finished) in Step S103, and if the obtaining is finished, proceeds to Step S111.

In Step S111, the average luminance La, the luminance uniformity ratio U, the size ω of the luminous surface 220 are obtained. These values may be set by a user of the method for evaluating discomfort glare or obtained from an information source. Further, these values may be calculated based on the above-described environment information and viewpoint information.

In the obtaining of the position index pi (Step S112), the position index pi is, for example, calculated based on the above-described environment information and viewpoint information. The position index may be set by a user of the method for evaluating discomfort glare or obtained from an information source.

Specifically, the average luminance La, the luminance uniformity ratio U, the size ω of the luminous surface 220 and the background luminance Lb in Step S111, and the position index pi in Step S112 may, for example, be supplied from a device using various sensors such as color sensors, photodiodes and image sensors or an information terminal device capable of input and output.

After executing Step S111 and Step S112, the process determines whether the obtaining is finished (setting finished) in Step S113, and if the obtaining is finished, proceeds to Step S120.

According to this procedure the discomfort glare of any interior environment 250 can be evaluated.

Figure 16:
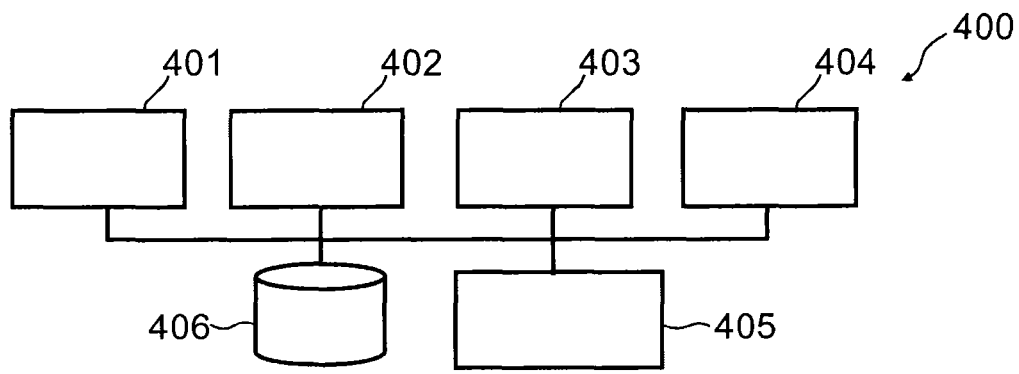
FIG. 16 is a block diagram showing a configuration of a discomfort glare evaluation device capable of implementing the method for evaluating discomfort glare according to the first embodiment.

FIG. 16 is a block diagram illustrating a configuration of a discomfort glare evaluation device capable of implementing the method for evaluating discomfort glare according to the first embodiment.

As shown in FIG. 16, a discomfort glare evaluation device 400 according to the embodiment includes, for example, a setting unit 401, a parameter calculating unit 402, a calculating unit 403, an output unit 404 and a power supply unit 405. The discomfort glare evaluation device 400 may further including a storage unit 406.

The setting unit 401, the parameter calculating unit 402, and the calculating unit 403 are functional blocks which may be integrated. For the discomfort glare evaluation device 400, an information device such as a computer or the like is used.

The setting unit 401 sets, for example, the above-described environment information relating to the interior environment 250. The setting unit 401 supplies, for example, the set environment information to the parameter calculating unit 402.

Based on the information obtained from the setting unit 401, the parameter calculating unit 402 calculates, for example, the average luminance La (or Li) of the luminous surface 220 of the luminaire 210, the luminance uniformity ratio U (or Ui) of the luminous surface 220, the size ω (or ωi) of the luminous surface 220, the background luminance Lb and the position index pi. The calculated values are supplied to the calculating unit 403.

The calculating unit 403 calculates the evaluation parameter value Y using the values supplied from the parameter calculating unit 402. For example, the calculating unit 403 calculates a value corresponding to a degree of discomfort glare felt by a person for the interior environment 250. The calculated value is supplied to the output unit 404.

The output unit 404 provides a user of the discomfort glare evaluation device 400 with the value calculated by the calculating unit 403. For the output unit 404, various types of display, printer or sound generating equipment can, for example be used. The output unit 404 may supply the data to other electronic equipment.

The power supply unit 405 supplies electrical power to each of the above-described units. The storage unit 406 stores required data, and supplies the data as required to the units.

The calculating unit 403 is capable of executing operations of the above-described Step S120. The calculating unit 403 may, for example, when the evaluation parameter value Y calculated in Step S120 exceeds a predetermined range, supply a signal that is a warning to the output unit 404. On obtaining the signal that is a warning, the output unit 404 may provide a warning signal such as a warning sound or warning indicator to the user. The output unit 404 may provide the warning signal together with the obtained evaluation parameter value Y.

By evaluating the discomfort glare using the method for evaluating discomfort glare according to the embodiment, it is possible to design light devices and lighting spacing with consideration for discomfort glare. For example, by using Formula 1 and/or Formula 6, it is possible to design luminaires and lighting spacing with low glare discomfort.

For example, in a lighting environment 250 using a luminaire 210 in which the average luminance La of the luminous surface 220 of the luminaire 210 is 20000 cd/m$^2$, the luminance uniformity ratio U of the luminous surface 220 is 0.01, the size ω (solid angle) of the luminaire 210 is 0.02 sr, the luminance (background luminance Lb) of the luminaire 210 is 20 cd/m$^2$ and the position index pi of the luminaire 210 is 10, the evaluation parameter Y for the discomfort glare of the interior environment 250 is, from Formula 6, 22.0. As already described, this value strongly matches the subjective evaluation value Esub.

When using the subjective evaluation characteristics described with reference to FIG. 10, the evaluation parameter Y of 22.0 corresponds to "start to feel discomfort". Suppose, for example, that a reference value is 19, which is the recommended UGR for offices. By using the embodiment, it can be seen that one way of reducing the evaluation parameter value from 22.0 to 19 or less than is to set the luminous surface 220 of the luminaire 210 to not less than 0.06.

Thus, by using the method for evaluating discomfort glare according to the embodiment, a design specification for a lighting spacing to reduce discomfort glare can be determined.

Note that various constants included in Formula 1 can be changed as required. For example, by using different constants to the constants in Formula 6, discomfort glare can be appropriately evaluated when the parameters have been logarithmized, when the calculation method for the luminance uniformity ratio U of the luminous surface 220 of the luminaire 210 has been changed, when the conditions of the luminaire 210 and the lighting spacing (interior environment 250) have been changed, or when the luminaire 210 is directly observed.

In the above, a case was described in which the evaluation parameter value Y of the discomfort glare was determined so as to match the subjective evaluation value Esub described with reference to FIG. 10, but the characteristics of subjective evaluation values Esub may differ from the characteristics described in FIG. 10. In this case, the constants of Formula 1 are appropriately set. Thus the constants in Formula 6 are also appropriately changed.

Thus, with the method for evaluating discomfort glare according to the embodiment, discomfort glare in a interior environment 250 using a luminaire 210 (such as an LED luminaire) having the luminous surface 220 (light emitting face) with a low luminance uniformity ratio U can be appropriately evaluated by simple calculation. Moreover, with the method for evaluating discomfort glare according to the embodiment, the discomfort glare of the luminaire 210 including a portion in which the luminous surface 220 (light emitting face) has a low luminance uniformity ratio U, can be found by simple calculation. Moreover, by appropriately evaluating the discomfort glare, lighting parameters can be proposed for obtaining the interior environment 250 (including the luminaire 210) with the degree of discomfort glare controlled to a desired level.

Second Embodiment

A second embodiment relates to a computer program for evaluating the discomfort glare.

A discomfort glare evaluation program according to the embodiment causes, for example, a computer to execute the operations described with reference to FIG. 15.

The program causes the computer to obtain information including average luminance information relating to the average luminance La of the luminous surface 220 of the luminaire 210, luminance uniformity ratio information relating to the luminance uniformity ratio U of the luminous surface 220, luminous surface size information relating to the size ω of the luminous surface 220, and background luminance information relating to the background luminance Lb of the luminaire 210 (Step S110 including Step S111).

The program causes the computer to calculate an evaluation parameter value based on the average luminance La, the luminance uniformity ratio U, the luminous surface size ω, and the background luminance Lb obtained in the above-described information obtaining. Specifically, the evaluation parameter value is calculated by dividing a product of a value based on La, a value based on U, and a value based on ω, by a value based on Lb (Step S120). The program may, for example, cause the computer to output a value based on calculated evaluation parameter value.

The above-described Step S110 may further cause the computer to obtain environment information relating to the interior environment 250 where the luminaire 210 is provided (Step S101) and obtain viewpoint information relating to the viewpoint 102 in the interior environment 250 (Step S102).

Step S110 may further cause the computer to obtain a predetermined position index pi for the ith (where i is an integer not less than 1) luminaire 210 (Step S112) based on the environment information and the viewpoint information.

The average luminance information includes the average luminance Li of the luminous surface 220 of the ith luminaire 210. The luminance uniformity ratio information includes the luminance uniformity ratio Ui of the luminous surface 220 of the ith luminaire 210. The luminous surface size information includes a size ωi of the emitting portion 220 of the ith luminaire 210. Also, Step S120 includes causing the computer to calculate the evaluation parameter value Y expressed in Formula 1. Further, in Step S120, the computer may be caused to output a value based on the evaluation parameter value Y.

For example, in Step S101, the computer is caused to obtain, as information relating to the interior environment 250, information relating to a size of the interior environment 250, an internal reflectance of the interior environment 250, information about the luminaire 210, a number of the luminaires 210 and the like. The information about the luminaire 210 includes a distribution of luminous intensity of the luminaire 210, a maximum luminance of the light emitting face (such as the luminous surface 220), a size (such as an area in meters squared) of the light emitting face, a conservation ratio, a dimming ratio and the like. The program may cause the computer to prompt the user of the method for evaluating discomfort glare to set the information relating to the interior environment 250. Alternatively, the program may cause the computer to obtain the information relating to the interior environment 250 from an information providing source.

For example, Step S102 causes the computer to obtain information relating to the position of the viewpoint 102 in the interior environment 250. The program may cause the computer to prompt the user of the method for evaluating discomfort glare to set the viewpoint information. Alternatively, the program may cause the computer to obtain the viewpoint information from an information providing source.

After executing Step S101 and Step S102, the process determines whether the obtaining is finished (setting finished) in Step S103, and if the obtaining is finished, proceeds to Step S111.

In Step S111, the program causes the computer to obtain the average luminance La, the luminance uniformity ratio U, the size ω of the lighting emitting portion 220, and the background luminance Lb. For example, the program may cause the computer to prompt the user of the method for evaluating discomfort glare to set the above-described values. Alternatively, the program may cause the computer to obtain the above-described values from an information providing source. A future possibility is that the program causes the computer to calculate the above-described values based on the above-described environment information and viewpoint information.

In Step S112, the program causes the computer to calculate the position index pi based on the above-described environment information and viewpoint information. The program may cause the computer to prompt the user of the method for evaluating discomfort glare to set the position index pi. Alternatively, the program may cause the computer to obtain the position index from an information providing source.

Specifically, the program may cause the computer to obtain, from various devices, the average luminance La, the luminance uniformity ratio U, the size ω of the luminous surface 220 and the background luminance Lb in Step S111, and the position index pi in Step S112. For the various devices, devices using various sensors such as color sensors, photodiodes and image sensors, an information terminal device capable of input and output or the like may be used.

After executing Step S111 and Step S112, the process determines whether the obtaining is finished (setting finished) in Step S113, and if the obtaining is finished, proceeds to Step S120.

According to this procedure, the discomfort glare of any interior environment 250 can be evaluated.

With the discomfort glare evaluation program according to the embodiment, the discomfort glare of luminaires such as the luminaire 210 having a low luminance uniformity ratio U (LED luminaires, for example), can be appropriately evaluated on a computer. Moreover, a lighting design with appropriately suppressed discomfort glare can be provided.

According to the embodiment, the method for evaluating discomfort glare and the discomfort glare evaluation program capable of appropriately evaluating discomfort glare can be provided.

Embodiments of the invention with reference to examples were described above. However, the embodiments of the invention are not limited to these examples. For example, if a person with ordinary skill in the art to which the invention pertains carries out the invention in the same way by selecting a specific configuration of elements for the luminaire, luminous surface, lighting environment, and so on for use in the method for evaluating discomfort glare, as appropriate from the publicly known scope and can obtain the same results, then this configuration is included within the scope of the invention.

Further, any two or more components of the specific examples may be combined within the extent of technical feasibility and are included in the scope of the invention to the extent that the purport of the invention is included.

Further, all methods for evaluating discomfort glare or discomfort glare evaluation programs obtained by a person skilled in the art through suitable design modifications based on the method for evaluating discomfort glare and discomfort glare evaluation program capable of appropriately evaluating discomfort glare in the manner described in these embodiments, are to be included within the scope of the invention.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A method for evaluating discomfort glare comprising:

obtaining average luminance information relating to an average luminance La ($cd/m^2$) of a luminous surface of a luminaire, luminance uniformity ratio information relating to a luminance uniformity ratio U (dimensionless value) of the luminous surface, luminous surface size information relating to a size ω (sr) of the luminous surface, and background luminance information relating to a background luminance Lb ($cd/m^2$) of the luminaire;

calculating an evaluation parameter value based on the average luminance La, the luminance uniformity ratio U, the luminous surface size ω, and the background luminance Lb obtained in the obtaining, the evaluation parameter value being a value of a product of a value based on the La, a value based on the U, and a value based on the ω divided by a value based on the Lb; and outputting the evaluation parameter to an output device for at least one of alerting a user and creating a design lighting specification based upon the evaluation parameter, wherein the luminance uniformity ratio U is a ratio of the average luminance La to a maximum value of the luminance of the luminous surface.

2. The method according to claim 1, wherein the obtaining further includes obtaining environment information relating to an interior environment provided with the luminaire, and viewpoint information relating to a viewpoint in the interior environment, the obtaining further includes obtaining information relating to a predetermined position index pi for an ith (where i is an integer not less than 1) luminaire, based on the environment information and the viewpoint information, the average luminance information includes the average luminance Li ($cd/m^2$) of the luminous surface of the ith luminaire, the luminance uniformity ratio information includes a luminance uniformity ratio Ui (dimensionless value) of the luminous surface of the ith luminaire, the luminous surface size information includes a size ωi (sr) of the luminous surface of the ith luminaire, and the calculating calculates, as the evaluation parameter value, a value Y expressed by formula 1 below $$Y = A \cdot \left[ \log \left\{ \frac{1}{L_b^a} \sum_i \frac{L_i^b \cdot f_i(U) \cdot \omega_i^c}{p_i^d} \right\} \right] + const1 \quad \text{(formula 1)}$$

$$f_i(U) = B \cdot (\log_k(U))^n + const2$$

where, in formula 1, the A, the B, the a, the b, the c, the d, the k, the n, the const1 and the const2 are constants, each of the a, the b, the c, the d, the k and the n is not less than 0 and not greater than 10, and the "·" represents a multiplication.

3. The method according to claim 2, wherein the a is not less than 0 and not more than 1, the b is 2, the c is not less than 0 and not more than 1, and the d is 2.

4. The method according to claim 2, wherein the a and the c are 1, and the b and the d are 2.

5. The method according to claim 4, wherein the k is a base of natural logarithm.

6. The method according to claim 5, wherein the n is 3.

7. The method according to claim 6, wherein the A is 5.712.

8. The method according to claim 7, wherein the B is −0.069, and the const2 is 0.412.

9. The method according to claim 8, wherein the const1 is 0.

10. The method according to claim 2, wherein the obtaining includes calculating at least one of the position index pi, the background luminance Lb, the average luminance La, the luminance uniformity ratio U, and the size ω of the luminous surface based on the environment information and the viewpoint information.

11. The method according to claim 2, wherein at least one of the environment information, the viewpoint information, the position index pi, the background luminance Lb, the average luminance La, the luminance uniformity ratio U, and the size ω of the luminous surface in the obtaining is an inputted value.

12. The method according to claim 2, wherein the obtaining includes measuring at least one of the environment information, the viewpoint information, the position index pi, the background luminance Lb, the average luminance La, the luminance uniformity ratio U, and the size ω of the luminous surface.

13. A non-transitory computer readable medium storing a discomfort glare evaluation program, which when executed by a computer causes the computer to perform a method, the method comprising:

obtaining information including average luminance information relating to an average luminance La of a luminous surface of a luminaire, luminance uniformity ratio information relating to a luminance uniformity ratio U of the luminous surface, luminous surface size information relating to a size ω of the luminous surface, and background luminance information relating to a background luminance Lb of the luminaire;

calculating an evaluation parameter value based on the average luminance La, the luminance uniformity ratio U, the luminous surface size ω, and the background luminance Lb obtained in the information obtaining, the evaluation parameter value being a value of a product of a value based on the La, a value based on the U, and a value based on the ω divided by a value based on the Lb; and outputting the evaluation parameter to an output device for at least one of alerting a user and creating a design lighting specification based upon the evaluation parameter, wherein the luminance uniformity ratio U is a ratio of the average luminance La to a maximum value of the luminance of the luminous surface.

14. The non-transitory computer readable medium according to claim 13, wherein the obtaining information further includes: obtaining environment information relating to an interior environment provided with the luminaire, and viewpoint information relating to a viewpoint in the interior environment, and the obtaining information further includes: obtaining information relating to a predetermined position index pi for an ith (where i is an integer not less than 1) luminaire, based on the environment information and the viewpoint information, the average luminance information includes an average luminance Li of the luminous surface of the ith luminaire, the luminance uniformity ratio information includes a luminance uniformity ratio Ui (dimensionless value) of the luminous surface of the ith luminaire, the luminous surface size information includes a size ωi of the luminous surface of the ith luminaire, and the calculating includes calculating, as the evaluation parameter value, a value Y expressed by formula 1 below $$Y = A \cdot \left[ \log \left\{ \frac{1}{L_b^a} \sum_i \frac{L_i^b \cdot f_i(U) \cdot \omega_i^c}{p_i^d} \right\} \right] + const1 \quad \text{(formula 1)}$$

$$f_i(U) = B \cdot (\log_k(U))^n + const2$$

where, in formula 1, the A, the B, the a, the b, the c, the d, the k, the n, the const1 and the const2 are constants, each of the a, the b, the c, the d, the k and the n is not less than 0 and not greater than 10, and the "·" represents a multiplication.

15. The non-transitory computer readable medium according to claim 14, wherein the a is not less than 0 and not more than 1, the b is 2, the c is not less than 0 and not more than 1, and the d is 2.

16. The non-transitory computer readable medium according to claim 14, wherein the a and the c are 1, and the b and the d are 2.

17. The non-transitory computer readable medium according to claim 16, wherein the k is a base of natural logarithm.

18. The non-transitory computer readable medium according to claim 17, wherein the n is 3.

19. The non-transitory computer readable medium according to claim 18, wherein the A is 5.712.

20. The non-transitory computer readable medium according to claim 19, wherein the B is −0.069, the const2 is 0.412, and the const1 is 0.

* * * * *